(12) United States Patent
Metzger

(10) Patent No.: US 8,929,096 B2
(45) Date of Patent: Jan. 6, 2015

(54) KIT FOR INSTALLATION OF WATER METER READING EQUIPMENT IN THREE CONFIGURATIONS

(75) Inventor: Eric Metzger, Franklin, WI (US)

(73) Assignee: Badger Meter, Inc., Milwaukee, WI (US)

( * ) Notice: Subject to any disclaimer, the term of this patent is extended or adjusted under 35 U.S.C. 154(b) by 345 days.

(21) Appl. No.: 13/467,702

(22) Filed: May 9, 2012

(65) Prior Publication Data

US 2013/0301190 A1   Nov. 14, 2013

(51) Int. Cl.
*H02B 1/20* (2006.01)

(52) U.S. Cl.
USPC ................. 361/827; 361/659; 361/679.04

(58) Field of Classification Search
USPC .......... 361/827, 659, 679.01, 679.02, 679.04; 343/700 R, 719, 872, 702, 769, 895; 342/464, 352
See application file for complete search history.

(56) References Cited

U.S. PATENT DOCUMENTS

| | | | |
|---|---|---|---|
| D348,384 S | 7/1994 | Karsten | |
| 6,025,786 A * | 2/2000 | Rayford | 343/877 |
| 6,331,838 B1 * | 12/2001 | Scott et al. | 343/715 |
| 6,378,817 B1 | 4/2002 | Bublitz et al. | |
| 6,617,976 B2 * | 9/2003 | Walden et al. | 340/870.02 |
| 7,283,063 B2 * | 10/2007 | Salser, Jr. | 340/870.02 |
| 7,446,672 B2 * | 11/2008 | Johnson et al. | 340/870.02 |
| 8,015,020 B2 | 9/2011 | Walding, Jr. et al. | |
| 8,116,071 B2 | 2/2012 | Showcatally | |
| 2005/0066746 A1 * | 3/2005 | Winter | 73/861.42 |

OTHER PUBLICATIONS

Badger ORION, Commercial Meter Mounting Bracket, Installation Data, ORI-I-76 (2-10), pp. 1-2.

* cited by examiner

*Primary Examiner* — Hung S Bui
(74) *Attorney, Agent, or Firm* — Boyle Fredrickson, S.C.

(57) ABSTRACT

A kit is disclosed for installing a radio frequency transmitter assembly (30) in position for radio transmission and reception when connected to a water meter register (26, 40) that is situated below ground level, the kit comprising: a base member (22) for extending substantially horizontally from the meter register (26, 40); a transmitter assembly (30) having a transmitter body (32) for attachment to the base member (22) with the transmitter body in an upright position; an electrical cable (17) connected at one end to the meter register (26, 40) and connected at an opposite end to the transmitter assembly (30). The kit provides a product that can be installed in any one of three different configurations.

17 Claims, 5 Drawing Sheets

KIT FOR INSTALLATION OF WATER METER READING EQUIPMENT IN THREE CONFIGURATIONS

TECHNICAL FIELD

The invention relates to water metering and networking equipment for use in subsurface pit enclosures in connection with water meters.

DESCRIPTION OF THE BACKGROUND ART

In moderate climate zones, water meters are located in subsurface enclosures in areas adjacent to residences or other dwellings. Such enclosures are commonly referred to as "pits." An example of such an enclosure is illustrated in Bublitz et al. U.S. Pat. No. 6,378,817.

As further disclosed in Bublitz et al., a radio frequency (RF) transmitter may be situated in an assembly which is mounted or otherwise positioned in the pit enclosure. Such a radio frequency transmitter transmits signals representing meter consumption data to a mobile collection unit which may be carried in a vehicle or which may be carried by a person. Radio frequency transmitters may also be used to transmit signals from such a pit enclosure in a fixed network with stationary collection units at predetermined locations.

Some utility customers desire to initially install a mobile network and later migrate to a fixed network arrangement. Products with different options have been offered in response to these requirements.

The technical problem to be overcome is to a universal product for mobile and fixed networks to save manufacturing and distribution costs and to provide versatility to the customer.

SUMMARY OF THE INVENTION

The invention is provided as a kit for installing a radio frequency transmitter assembly in position for radio transmission and reception when connected to a water meter register that is situated below ground level. The kit comprises a base member for attachment to the meter register and for extending substantially horizontally from the meter register; a transmitter assembly having a transmitter body for attachment to the base member with the body in an upright position; an electrical cable electrically connected at one end to the meter register and electrically connected at an opposite end to the transmitter assembly. The electrical cable has a length from approximately six feet to approximately twelve feet i) that is wrapped around the transmitter body when the transmitter body is attached to the base member, ii) that is at least partly unwound when the transmitter body is attached to a pit lid of a subsurface enclosure and iii) that is fully unwound when the transmitter body is mounted on a supporting structure up to twelve feet away from the meter register.

Preferably, the cable is approximately ten feet in length, but a goal of the invention is to provide a substantially longer cable than the prior cable of three feet, and this is in a range from approximately six feet to approximately twelve feet. The term "approximately" as used herein shall mean plus or minus three inches.

When the cable is fully unwound, a bracket may be provided for mounting the tubular body on a supporting structure at a distance corresponding to a full length the cable.

The kit may also include parts for attaching the transmitter body to a pit lid, such as a cap with a threaded aperture, to receive the tubular and an adjustment nut for positioning on an underside of the pit lid to adjust the height of the transmitter body.

It can be seen from the this summary, that the kit provides for installing the transmitter assembly in any one of three different configurations relative to the meter register and accompanying equipment.

In other new features, the base member has a shape of a figure eight and the transmitter body is attached into a second loop of the base member. The transmitter body has a lower end which together with the second loop of the base member forms a bayonet connection. In the first configuration, the transmitter assembly may also comprise a cover that is attached to the one loop in the base member and fits over the transmitter body when the transmitter body is also attached to the second loop in the base member. The cover is rectangular at a base and has an upper portion tapering to an approximately rectangular top surface of smaller cross section than the base.

Other features and advantages of the invention, besides those discussed above, will be apparent to those of ordinary skill in the art from the description of the preferred embodiments which follows. In the description, reference is made to the accompanying drawings, which form a part hereof, and which illustrate examples of preferred embodiments of the invention.

DETAILED DESCRIPTION OF THE PREFERRED EMBODIMENTS

Figure 1:
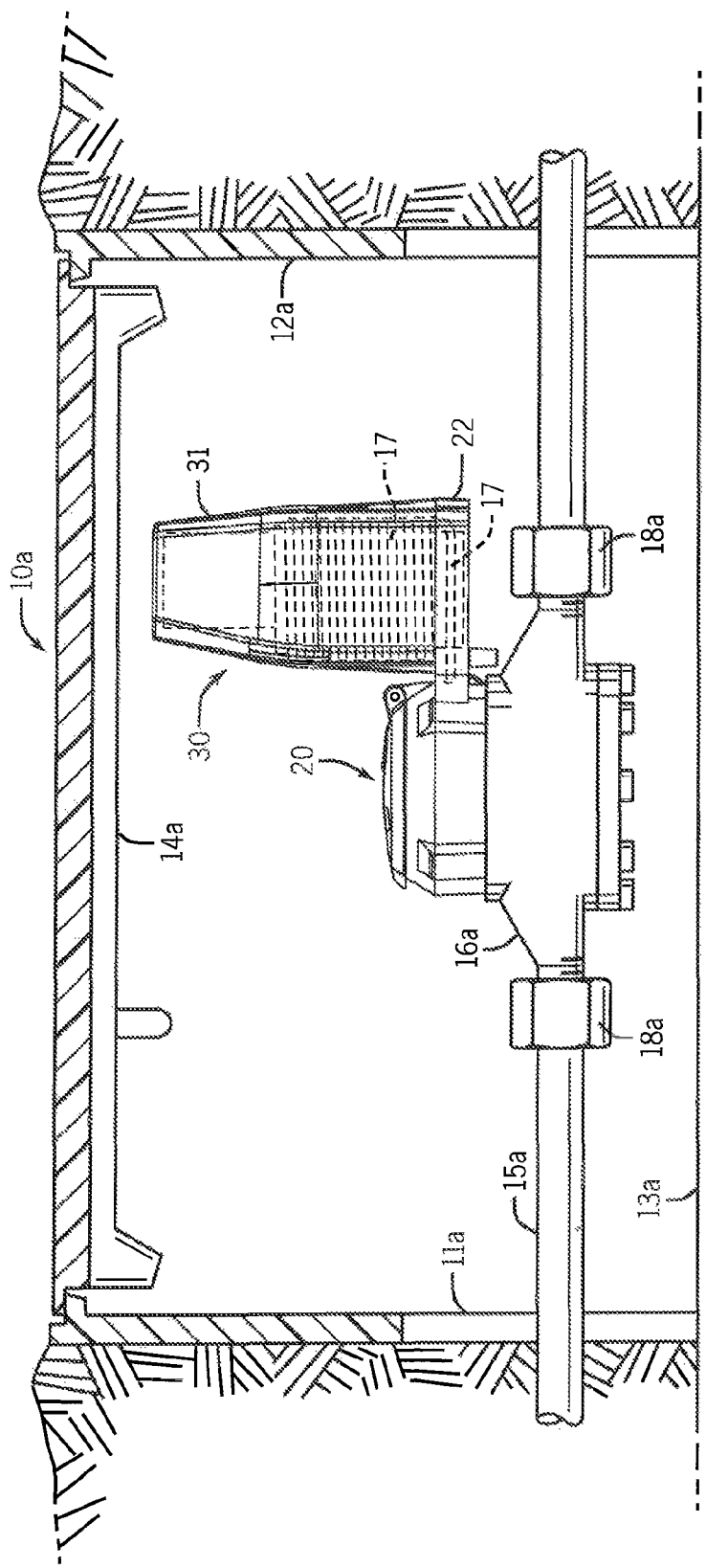
FIG. 1 is a side view in elevation of a first configuration of the present invention, in a pit enclosure shown in section.

FIG. 1 illustrates a subsurface enclosure 10a, referred to as a "pit." The enclosure 10a is positioned at and below the surface of the ground and includes opposing, generally upright side walls 11a, 12a, an open or closed bottom 13a and a lid 14a at approximately ground level for closing the enclosure 10a from the top. The enclosure 10a is preferably made of a non-metallic polymer material, but other non-metallic materials such as concrete, polyethylene and various other composite materials can be used. The enclosure can also be metallic for the configurations shown in FIG. 2, but is not preferred due to the effect of a large metal object on radio transmissions from equipment installed in the pit.

A water pipeline 15a runs through the enclosure 10a below ground level. A meter housing 16a containing a water metering element (not shown) is connected in the water pipeline 15a inside the pit enclosure 10 using nuts 18a.

The movements of the water metering element in response to flow are magnetically sensed by a meter register assembly 20. The meter register assembly 20 provides either one or both of a visual display for displaying water consumption data and a pulse transmitter for transmitting an electrical signal corresponding to water consumption data. The signal is transmitted via an electrical cable 17 to a transmitter assembly 30 enclosed within transmitter housing cover 31. This provides a double wall of protection for the electronics housed inside the transmitter assembly 30.

FIG. 1 shows an integral configuration, in which the transmitter assembly 30 is supported on one half of a "figure-8" shaped base member 22 (FIG. 4) which forms a part of the meter register housing assembly. The transmitter assembly 30 will transmit radio frequency signals to a mobile or fixed data collector (not shown) of a type known in the art, and will in some cases receive signals from the data collector.

Figure 2:
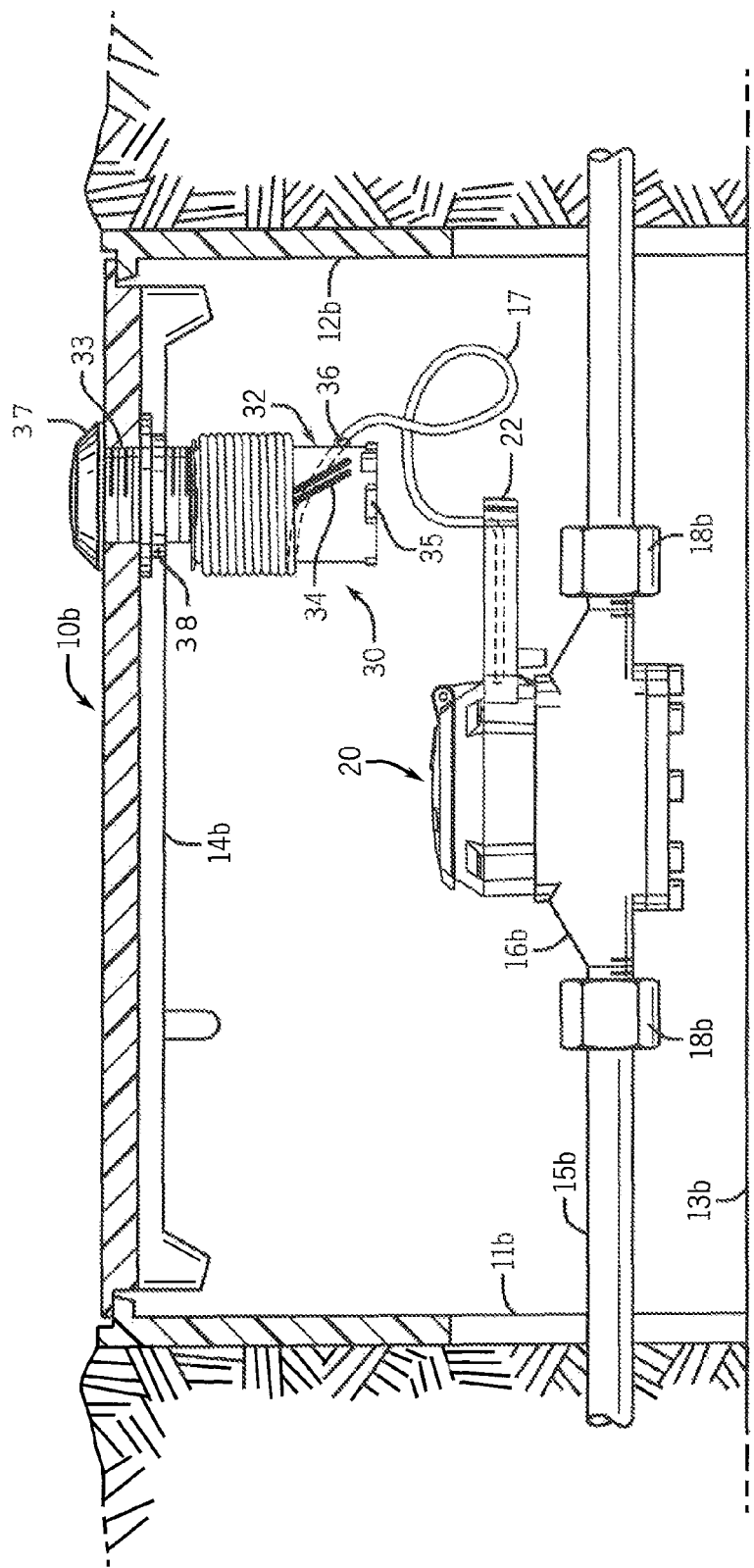
FIG. 2 is a side view in elevation of a second configuration of the present invention, in a pit enclosure shown in section.

FIG. 2 shows a second configuration of the present invention. Where the parts are identical they are numbered the same as in FIG. 1. Where the parts are similar but need not be identical, they have been provided with the suffixes "a", "b" and "c" in the succeeding Figures.

In FIG. 2, the cover 31 for the transmitter assembly 30 has been removed, and an elongated transmitter body 32 has been attached to the pit lid 14 using a disk-shaped cap 37. The transmitter body 32 provides a housing with a threaded upper portion 33 that is received with a mating threaded aperture (not shown) in the cap 37. A flanged, threaded retainer 38 is installed on the threaded upper portion 33 before inserting the body 32 through a hole in the pit lid 14a. The retainer 38 can be adjusted to control the height of the transmitter body 32 and to clamp the assembly 30 to the pit lid 14a. This configuration is suitable for metal pit lids, as an antenna within the threaded upper portion 33 of the tubular body 32 will project above the pit lid.

The electrical cable 17 is connected on one end to the meter register 20 and is unwound from a lower tubular portion 34 of transmitter body 32. Also, seen in FIG. 2, there are some projections 35 at the lower end of the transmitter body 32 for sliding into grooves formed inside one loop of the base member 22 to provide a bayonet-type connection. In this type of connection the lower end of the body 32 is pushed down into the loop 22b and then rotated to secure the body 32 against withdrawal in an axial direction.

In the prior art, the two configurations in FIGS. 1 and 2 were sold separately, as the integral assembly of the meter register 20 and transmitter assembly 30 typically did not include an electrical cable to allow positioning of the transmitter body 21 as shown in FIG. 2, unless specially ordered. The length of the optional electrical cable was three (3) feet.

Figure 3:
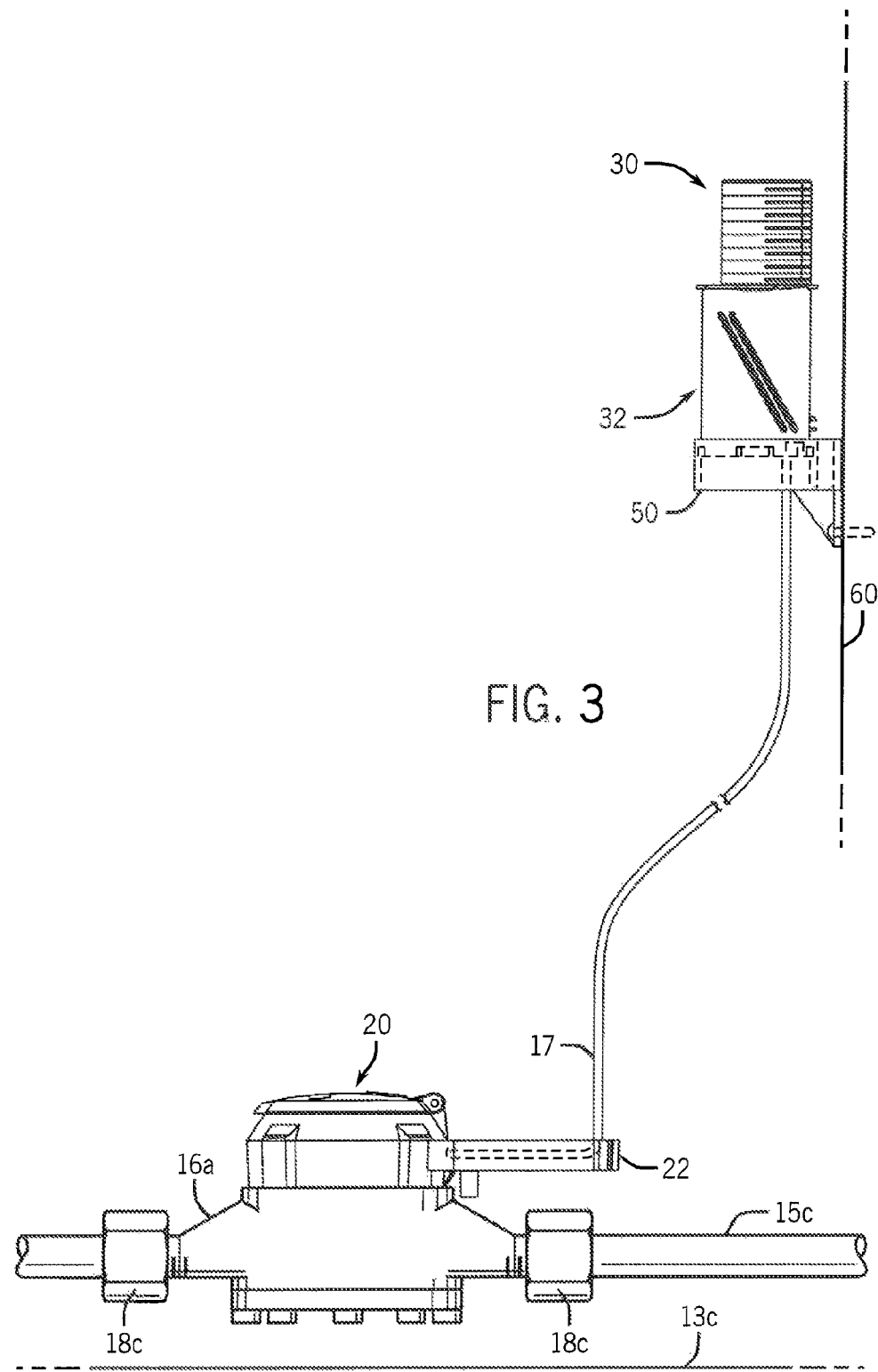
FIG. 3 is a side view in elevation of a third configuration of the present invention.

With the present invention, the electrical cable 17 has been extended to a length of ten (10) feet and provided in a standard transmitter assembly for use in any of the three configurations seen in FIGS. 1, 2 and 3. The electrical cable is wrapped around the lower tubular portion 34 which has ribs 34a for assisting in wrapping and holding the electrical cable 17 on the lower tubular portion 34. The ribs 34a are disposed at a thirty degree angle from a longitudinal axis of the tubular portion 34. The electrical cable 17 is fed through a hole in the lower tubular portion and its position is controlled by a slidable band or clip 36 fitted against the tubular portion 34. This will keep the electrical cable from fully unwinding.

FIG. 3 shows a "remote" configuration, which may be installed in a basement of a building or other location, usually outside of a pit enclosure. The meter housing 16a contains a water metering element (not shown) and is connected in the water pipe line 15c. The movements of the water metering element, in response to flow, are coupled to the meter register 20. The meter register 20 then transmits an electrical signal corresponding to water consumption data. The signal is transmitted via an electrical cable 17 to the transmitter body 32 which is now mounted on a wall 60 and supported with a bracket 50 of a type known in the art or other supporting structure, up to ten feet away from the meter register 20. It is preferable that the transmitter assembly 30 be mounted at a greater height than the meter register 20, particularly where the equipment is located in a basement, to improve radio communication with a collector unit located outside of the building and some distance away.

Although the electrical cable is approximately ten feet in length, the concept of the invention is to provide a substantially longer cable than the prior electrical cable of three feet, and this length is in a range from approximately six feet to approximately twelve feet. The term "approximately" as used herein shall mean plus or minus three inches.

Figure 4:
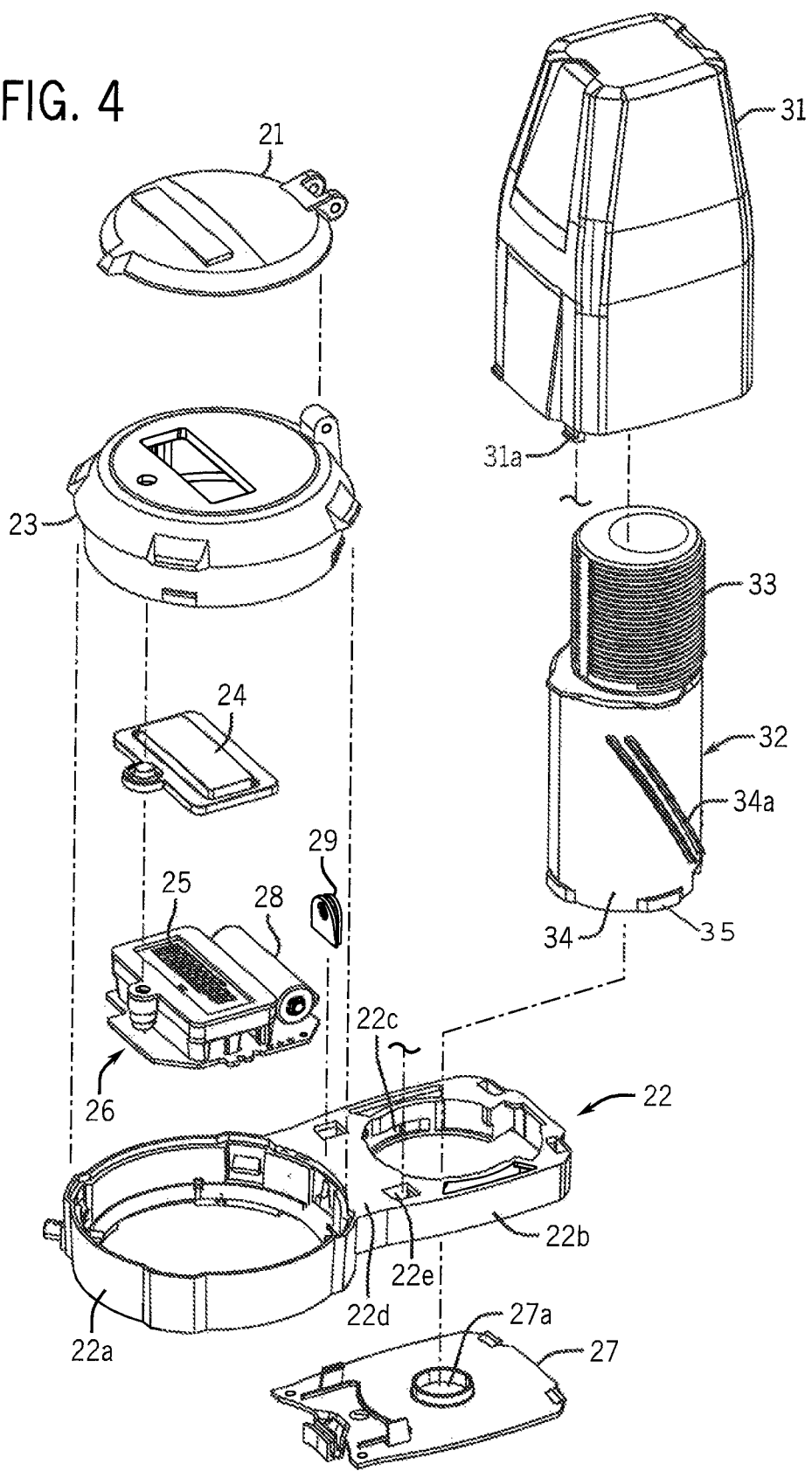
FIG. 4 is an exploded perspective view an assembly shown in FIGS. 1, 2 and 3.

FIG. 4 shows the parts of the assemblies in greater detail. A meter register assembly 20 includes a lid 21 and an upper body part 23 with an opening for receiving a transparent window part 24 for viewing an alphanumeric display 25. The display 25 is part of an electronic meter register 26 assembled within the meter register housing assembled from elements 21, 23 and 22a. This electronic meter register 26 includes a receptacle for a battery 28 which provides the power for the device for up to ten (10) years. A cable washer 29 may be positioned in a slot between the first loop and the second loop to guide the electrical cable from the meter register assembly 20 to the transmitter body 32. The figure-eight shaped base member 22 has one loop 22a that forms a lower body part of the register body.

The figure-eight shaped base member 22 forms a second loop 22b extending horizontally from the first loop 22a and for receiving the lower end of the transmitter body 32. The transmitter body 32 is inserted into the opening in the loop 22b and is rotated to make a bayonet-type connection between the projections 35 and the grooves 22c inside the second loop of the base member. The transmitter assembly cover 31 is assembled over the tubular transmitter body 32 with projections 31a at the bottom of the cover being received in apertures 22e in the top wall 22d of the second loop 22b of the base member 22.

A bottom cover 27 closes over the bottom of the second loop 22b. A hole 27a in the bottom cover 27 provides access to an optical port (not shown) on the bottom of the transmitter body 32.

Inside the transmitter body 32 is a transmitter circuit board with transmitter electronics including a microelectronic CPU, one or more memories and a port for receiving signals from the meter register through the electrical cable seen in FIGS. 1, 2 and 3. Another battery power source with an expected life of at least ten years is mounted on the circuit board. Also located inside the upper portion of transmitter assembly body 32 and connected to the transmitter circuit board is a radio frequency antenna.

The transmitter electronics receive digital meter data signals from the electronic meter register 26 and modulate the data onto radio frequency carrier signals for transmission through the antenna to the collector station. Radio signals received through the antenna can be demodulated to obtain digital data signals with data for controlling operation of the transmitter and the meter register. Thus, it can be seen that the location of the transmitter assembly is important to transmission range and reception of the transmitter assembly.

Figure 5:
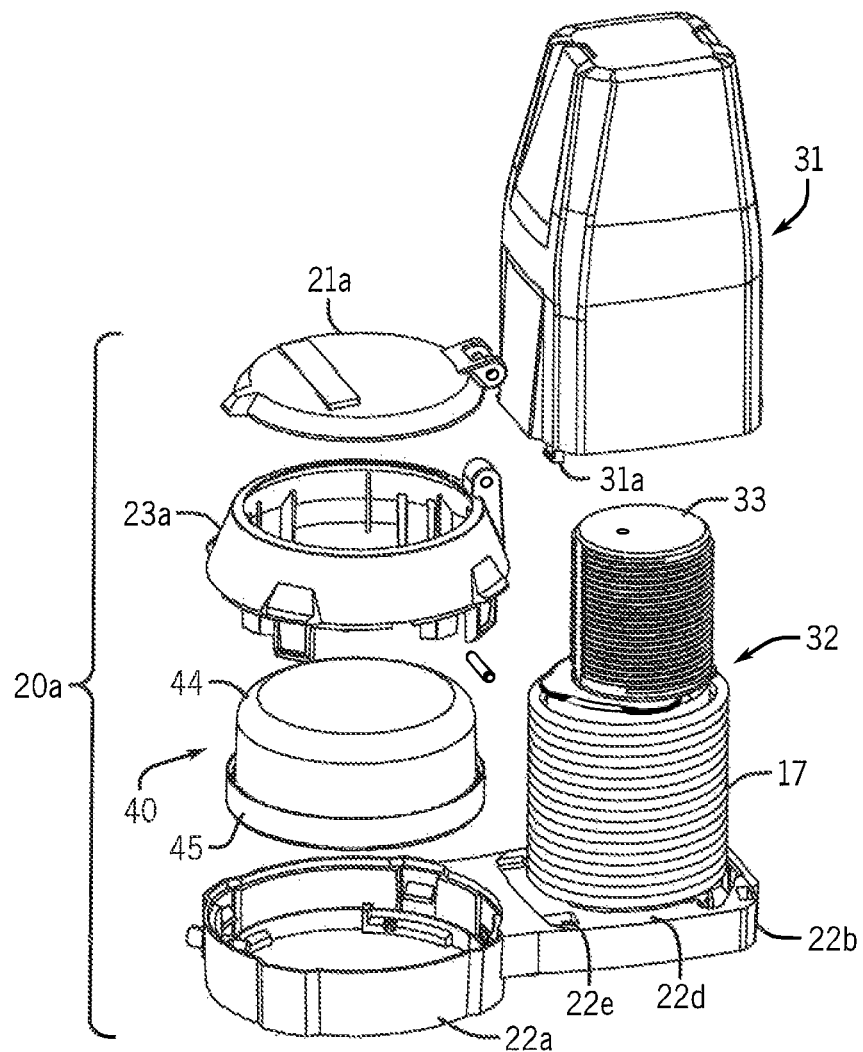
FIG. 5 is a partially exploded view of an alternative type of meter register that can be installed as shown in FIGS. 1, 2 and 3.

FIGS. 1-4 show the invention applied to an electronic meter register 20. FIG. 5 shows the invention applied to an electromechanical, pulse-transmitter type of meter register 40 in a configuration comparable to FIG. 1. A meter register 40 of this type is disclosed in Walding, Jr. et al., U.S. Pat. No. 8,015,020, FIGS. 7-9. Such a meter register 40 offers advantages in protection against moisture in the pit environment and does not require a battery.

The housing 20a for the meter register 40 includes a lid 21a, hinge pin 21b and an upper housing body part 23a which has been modified from the housing 23 shown in FIG. 4. While the housing body part 23 in FIG. 4 is closed over the top when assembled with the transparent window 24, the housing part 23a in FIG. 5 is open at the top to receive a glass lens 44. The meter register 40 has a glass lens part 44 for viewing an alphanumeric display (not shown). The glass lens 44 is secured in a metal base 45 as disclosed in U.S. Pat. No. 8,015,020, cited above, to enclose an electromechanical instrument works (not shown). The glass lens and metal base assembly 40 are disposed in the first loop 22a of the figure-eight shaped base member 22. The upper housing part 23 is snapped into the loop 22a that forms a lower body part of the register body.

The figure-eight shaped base member 22 forms a second loop 22b extending horizontally from the first loop 22a and for receiving the lower end of the transmitter body 32. The transmitter body 32 is inserted into the opening in the loop 22b and is then rotated to make a bayonet-type connection between the projections 35 and the grooves 22c inside the second loop of the base member as seen in FIG. 4. The electrical cable 17 is shown wound around the transmitter body 32 in the configuration shown in FIG. 1. The transmitter assembly cover 31 is ready for assembly over the tubular transmitter body 32 with projections 31a at the bottom of the cover being received in apertures 22e in the top wall 22d of the second loop 22b of the base member 22. A bottom cover (not shown) closes over the bottom of the second loop 22b.

The transmitter 32 in FIG. 5 can also be reconfigured as shown in FIGS. 2 and 3 for the electronic meter register 26.

The description herein has detailed a kit for installing the transmitter assembly in each of three configurations according to the environment immediately surrounding the meter and meter register.

The description herein has also detailed a kit for installing the transmitter assembly 32 with two different types of registers in each of three configurations.

This has been a description of the preferred embodiments of the invention. For embodiments falling within the spirit and scope of the present invention, reference is made to the claims which follow.

I claim:

1. A kit for installing a radio frequency transmitter assembly in position for radio transmission and reception when connected to a water meter register that is situated below ground level, the kit comprising:
   a base member for attachment to the water meter register and for extending substantially horizontally from the meter register;
   a transmitter assembly having a transmitter body for attachment to the base member with the body in an upright position;
   an electrical cable electrically connected at one end to the water meter register and electrically connected at an opposite end to the transmitter assembly;
   wherein the electrical cable has a length from approximately six feet to approximately twelve feet i) that is wrapped around the transmitter body when the transmitter body is attached to the first base member, ii) that is at least partly unwound when the transmitter body is attached to a pit lid of a subsurface enclosure and iii) that is fully unwound when the transmitter body is mounted on a supporting structure up to twelve feet away from the meter register.

2. The kit of claim 1, wherein the electrical cable has a length of approximately ten feet.

3. The kit of claim 2, wherein the electrical cable is fully unwound from the transmitter body, and further comprising a bracket for mounting the transmitter body on a supporting structure at a distance corresponding to a full length the electrical cable.

4. The kit of claim 3, wherein the transmitter body has a lower portion with a pair of closely spaced ribs formed on the transmitter body and means for holding the turns of a wrapped portion of the electrical cable next to each other.

5. The kit of claim 4, further comprising means for attaching the transmitter body of the transmitter assembly to a pit lid.

6. The kit of claim 1, wherein the base member has a shape of a figure eight, and wherein the transmitter body is attached into one loop of the base member.

7. The kit of claim 6, wherein the transmitter body has a lower end which together with the one loop of the base member forms a bayonet connection.

8. The kit of claim 7, further comprising a cover that is attached to the one loop in the base member and fits over the transmitter body when the transmitter body is also attached to the one loop in the base member to form a double-walled housing for the transmitter.

9. The kit of claim 8, further comprising means for attaching the transmitter body of the transmitter assembly to a pit lid.

10. The kit of claim 9, wherein the electrical cable has a length of approximately ten feet.

11. The kit of claim 10, wherein the transmitter body has a lower portion with a pair of closely spaced ribs formed on the transmitter body and means for holding turns of a wrapped portion of the electrical cable next to each other.

12. The kit of claim 11, wherein the electrical cable has a length that is fully unwound, and further comprising a bracket for mounting the transmitter body on a supporting structure at a distance corresponding to a full length the electrical cable.

13. The kit of claim 12, wherein the base member has a shape of a figure eight, and wherein the transmitter body is attached into one loop of the base member.

14. The kit of claim 13, wherein the transmitter body has a lower end which forms a bayonet connection with the one loop of the base member.

15. The kit of claim 14, further comprising means for attaching the transmitter body of the transmitter assembly to a pit lid.

16. The kit of claim 14, further comprising a cover that is attached to the one loop in the base member, and fits over the transmitter body when the transmitter body is also attached to the one loop in the base member.

17. The kit of claim 16, wherein the cover is rectangular at a base and has an upper portion tapering to an approximately rectangular top surface of smaller cross section than the base.

* * * * *